United States Patent Office 3,328,476
Patented June 27, 1967

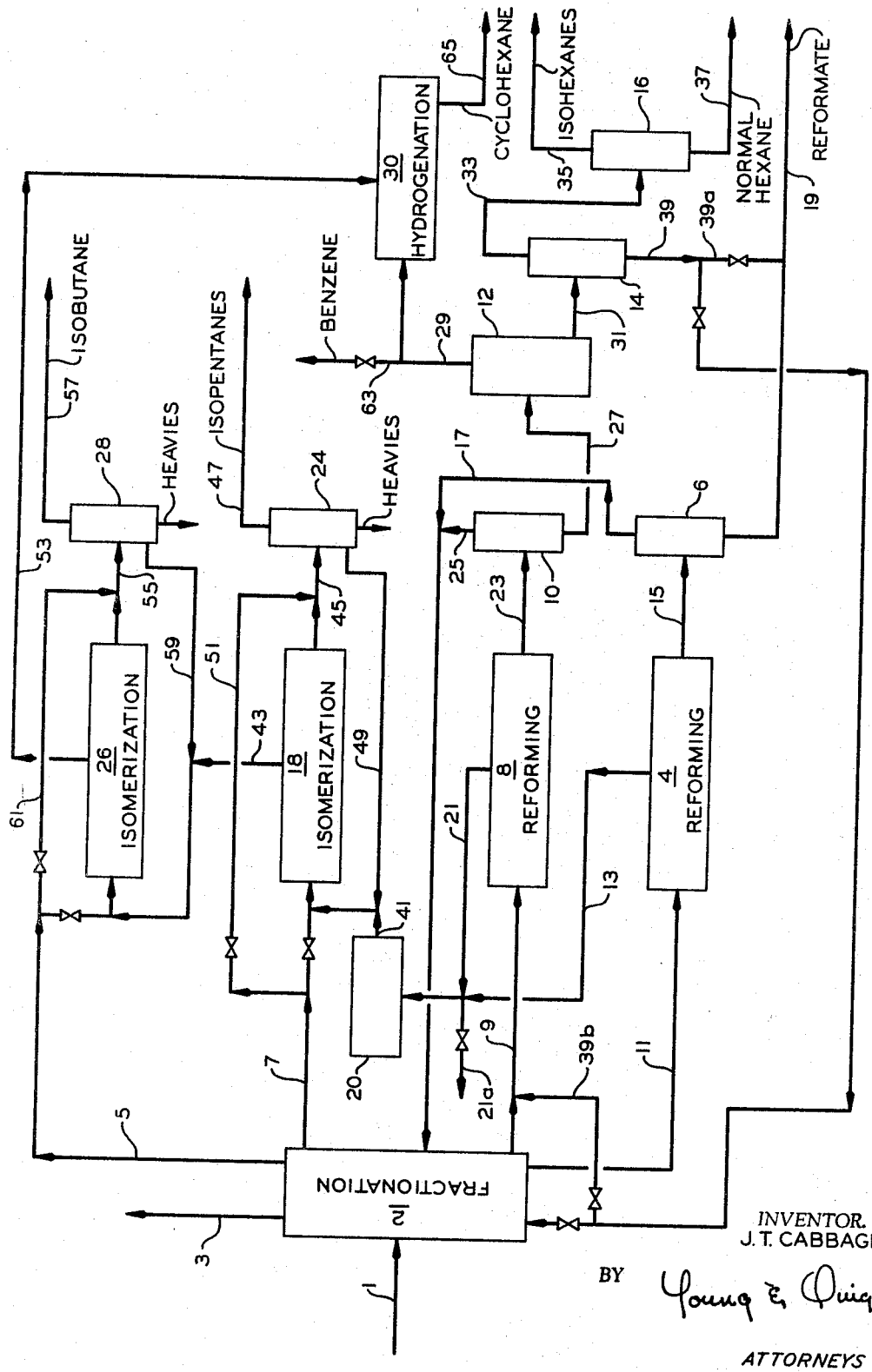

3,328,476
HYDROGENATION WITH PURIFIED REFORMER
HYDROGEN
John T. Cabbage, Bartlesville, Okla., assignor to Phillips
Petroleum Company, a corporation of Delaware
Filed Oct. 21, 1964, Ser. No. 405,359
7 Claims. (Cl. 260—667)

This invention relates to integrated hydrocarbon conversion processes to prepare reformer produced hydrogen suitable for use in a hydrogenation process.

In refinery operations several hydrocarbon conversion processes are conducted in generally close physical proximity. Typical processes include catalytic reforming, catalytic pentane hydroisomerization, and catalytic butane hydroisomerization. The reforming process is a source of hydrogen for use in other conversion processes. A generally practiced process requiring a source of hydrogen is the hydrogenation of benzene to produce cyclohexane. If the source of hydrogen utilized in the latter process contains $C_6$ and higher hydrocarbons, as does the hydrogen formed in a reforming operation, the purity of the cyclohexane produced is limited to about 99.0 percent because of the difficulty in separating the $C_6$ hydrocarbons from the cyclohexane. Such a hydrogenation process requires a large volume hydrogen. The hydroisomerization processes do not consume much hydrogen as it is used primarily to maintain catalyst activity and the hydrocarbons present in the hydrogen stream do not adversely affect these processes.

It would be desirable to use reformer produced hydrogen in hydrogenation processes for economical reasons; however, the generally practiced purification methods of adsorption or refrigeration are costly and make such use undesirable.

Accordingly, it is an object of this invention to provide an effective and economical method of preparing a stream containing hydrogen for use in a hydrogenation process.

Another object of this invention is to provide a method for the preparation of reformer produced hydrogen suitable for a hydrogenation process.

Still another object of this invention is to provide a method for integrating refining operations to obtain a source of hydrogen suitable for processes such as the hydrogenation of benzene.

A further object of this invention is to provide for improved purity cyclohexane production.

Other objects, aspects and advantages of this invention will become apparent to one skilled in the art upon further study of this disclosure, the drawing and appended claims.

In accordance with this invention reformer produced hydrogen prepared for removal of $C_6$ hydrocarbons is used as the source of hydrogen in the hydrogenation of hydrocarbons, such as benzene, to form cyclohexane. The reformer hydrogen produced stream is prepared by passing it through isomerization operations wherein the $C_6$ hydrocarbons are absorbed in the products produced therein and removed from the hydrogen stream. The presence of lighter hydrocarbons picked up by the hydrogen stream passing through the isomerization processes does not affect the purity of the cyclohexane produced in the hydrogenation process because such lighter hydrocarbons can be effectively and economically removed from the cyclohexane.

The refining operations of catalytic reforming and catalytic isomerization are known in the art, as well as hydrogenation processes. Any type of such operations and processes, including the various catalysts employed, can be used in the individual steps of this invention. Thus, this invention is applicable to any type reforming operation which produces a hydrogen stream and any type isomerization operation for hydrocarbons lighter than that produced by the hydrogenation process.

A better understanding of this invention can be obtained by the following description referring in detail to the drawing which is a schematic process flow diagram.

Referring now to the drawing, natural gas liquids and straight run gasoline are introduced through conduit 1 to fractionation zone 2. The feed to zone 2 is separated and removed as follows: conduit 3—propane and lighter, conduit 5—butanes, conduit 7—pentanes, conduit 9—hexanes, conduit 11—heptanes and heavier hydrocarbons. The heptanes and heavier material are introduced through conduit 11 to reforming zone 4. Hydrogen produced by reforming is withdrawn through conduit 13. The reformed material is withdrawn through conduit 15 and passed to separation zone 6 for removal of $C_5$ and lighter hydrocarbons via conduit 17. Conduit 17 introduces these materials back into fractionation zone 2. Reformate is withdrawn through conduit 19. The hexanes are introduced through conduit 9 to reforming zone 8. Hydrogen produced by reforming is withdrawn through conduit 21 and combined with the hydrogen in conduit 13. The reformed material is withdrawn through conduit 23 and passed to separation zone 10 for removal of $C_5$ and lighter hydrocarbons via conduit 25. The material in conduit 25 is introduced into conduit 17 for return to zone 2. The reformed material is withdrawn through conduit 27 and passed to separation zone 12. Separation zone 12 can be a solvent extractor with benzene being removed through conduit 29 and the remainder of the reformed material withdrawn through conduit 31 and passed to separation zone 14 for removal of $C_6$ hydrocarbons via conduit 33. Conduit 33 introduced this material to separation zone 16 from which iso $C_6$ hydrocarbons are removed via conduit 35 and normal $C_6$ hydrocarbon is removed via conduit 37. Heavier material is removed from zone 14 through conduit 39 and returned to zone 2. If desired, this heavier material can be passed through valved line 39a into conduit 19 for removal as reformate. Also, the recycle can by-pass zone 2 and the material introduced via valved line 39b into the hexane fraction in conduit 9.

The pentanes are introduced through conduit 7 to isomerization zone 18. The hydrogen produced by reforming zones 4 and 8 is combined from conduits 13 and 21, a portion is removed as untreated hydrogen yield through valved conduit 21a and the remainder is introduced into hydrogen treating zone 20. Hydrogen treating zone 20 can be any suitable treating step such as amine or caustic treating to remove nonhydrocarbon isomerization catalyst poisons. The treated hydrogen is removed through conduit 41 and introduced into zone 18. A hydrogen stream containing less $C_6$ hydrocarbons than in conduit 41 is withdrawn through conduit 43. Isomerization effluent is withdrawn through conduit 45 and introduced into separation zone 24 where iso $C_5$ hydrocarbons are removed through conduit 47. Normal $C_5$ hydrocarbon is removed from zone 24 and recycled to zone 18 through conduit 49. Heavies, including $C_6$ hydrocarbons, are removed by conduit 50. If desired, the pentane in conduit 7 may by-pass zone 18 via conduit 51 and be introduced directly into conduit 45 and zone 24. In this manner the isopentanes are removed therefrom and normal pentane feed is charged to zone 18 via conduit 49 to be isomerized.

The butanes are introduced through conduit 5 to isomerization zone 26. The hydrogen recovered from isomerization zone 18 is introduced into zone 26 through conduit 43. A hydrogen stream containing less $C_6$ and $C_5$ hydrocarbons than in conduit 43 is withdrawn through conduit 53. Isomerization effluent is withdrawn through conduit 55 and introduced into separation zone 28 where iso $C_4$ hydrocarbon is removed through conduit 57. Normal $C_4$ hydrocarbon is removed from zone 28 and recycled to zone 26 through conduit 59. Heavies, including $C_5$ and $C_6$ hydrocarbons, are removed by conduit 60. If desired, the butanes in conduit 5 may by-pass zone 26 via conduit 61 and be introduced directly into conduit 55 and zone 28. In this manner the isobutane is removed therefrom and normal butane feed is charged to zone 26 via conduit 59 to be isomerized.

The benzene removed from zone 12 via conduit 29 is introduced into hydrogenation zone 30. Product benzene as required is removed by way of conduit 29 through conduit 63. The hydrogen, substantially free of $C_6$ hydrocarbons, recovered from isomerization zone 26 is introduced into zone 30 through conduit 53. A cyclohexane-containing stream substantially free of other $C_6$ hydrocarbons is removed from zone 30 through conduit 65 and passed to conventional separation and purification equipment for separating $C_5$ and lighter hydrocarbons from the product cyclohexane to yield a purity of about 99.7 percent. These separated hydrocarbons may be recycled to fractionation zone 2.

Various necessary valves, pumps, recycle lines, and the like have intentionally been omitted from the drawing for clarification.

Although the above description and following example recite specific hydrocarbons, it is to be understood that this invention is not intended to be limited thereto.

*Example*

When using the integrated system described above, it becomes practical to produce greater than 99 percent pure cyclohexane, actually 99.7 percent, as shown by the following operating conditions, material balance, and component analysis of the pertinent streams containing the desirable hydrogen. The following material balance given in Tables I and II, using numerical identifications of the drawing, represents operations in accordance with this invention.

TABLE II

| Components | Hydrogen Streams Mol Percent | | | |
|---|---|---|---|---|
| | 13 and 21 | 41 | 43 | 53 |
| Hydrogen | 87.96 | 87.96 | 86.35 | 85.20 |
| Methane | 5.00 | 6.00 | 5.90 | 5.80 |
| Ethane | 3.00 | 3.00 | 2.94 | 2.90 |
| Propane | 1.50 | 1.50 | 1.47 | 1.44 |
| Butanes | 0.80 | 0.80 | 2.26 | 3.76 |
| Pentanes | 0.40 | 0.40 | 0.88 | 0.80 |
| Hexanes (plus) | 0.34 | 0.34 | 0.20 | 0.10 |
| $H_2S$ (grains/100 cu. ft.) | (10) | (0) | (0) | (0) |
| Total | 100.00 | 100.00 | 100.00 | 100.00 |

From this analysis of the streams containing hydrogen it is noted that actually the hydrogen purity decreases, but more important it is seen that the $C_6$ and plus hydrocarbons have been decreased. It is the $C_6$ content of the stream that is required to be low to achieve high purity cyclohexane from the benzene hydrogenation zone because of the difficulty encountered when separating $C_6$ hydrocarbons from cyclohexane which have close boiling points. The increase of pentanes and butanes in the hydrogen stream does not materially affect the purification of the cyclohexane produced because they are easily separated from cyclohexane.

Reasonable variations and modifications of this invention will be apparent to one skilled in the art which will not depart from the scope of this disclosure.

That which is claimed is:
1. A process for hydrogenating a feed hydrocarbon to produce a high purity product comprising passing a first stream containing hydrogen and hydrocarbons having the same number of carbon atoms as said feed hydrocarbon to an isomerization zone wherein a hydrocarbon containing fewer carbon atoms than said feed hydrocarbon is isomerized, thereby absorbing hydrocarbons in said first stream having the same number of carbon atoms as said feed hydrocarbon; withdrawing a second stream from said isomerization zone containing fewer hydrocarbons having the same number of carbon atoms as said feed hydrocarbon than in said first stream; and passing said second stream to a hydrogenation zone for hydrogenation of said feed hydrocarbon.

2. The process of hydrocarbon conversion comprising:
 (a) reforming a hydrocarbon stream to produce a stream rich in hydrogen and containing hydrocarbons;

TABLE I

| Variable | Operating Unit | | | | | |
|---|---|---|---|---|---|---|
| | Zone 4 | Zone 8 | Zone 20 | Zone 18 | Zone 26 | Zone 30 |
| Pressure, p.s.i.g. | 600 | 500 | 400 | 550 | 490 | 500. |
| Temperature, °F | 895 | 905 | 100 | 730 | 370 | 400. |
| Hydrogen/Hydrocarbon, Mol Ratio | 8:1 | 6:1 | | 2:1 | 0.5:1 | 9:1. |
| Feed, bbl./hr. | 500 [1] | 400 [2] | 380,000 [3] | 330 [4] | 400 [5] | 60 [6] |
| Hydrogen Yield, s.c.f./hr. | 500,000 | 360,000 | 380,000 | 380,000 | 370,000 | |
| Reformate Yield, bbl./hr. | 510 | 400 [7] | | | | |
| Catalyst or Reagent | A | A | B | C | D | E. |
| Composition | See Streams 13 and 21, Table II. | See Streams 13 and 21, Table II. | See Stream 41, Table II. | See Stream 43, Table II. | See Stream 53, Table II. | |
| Isopentane Yield, bbl./hr. | | | | 335 | | |
| Isobutane Yield, bbl./hr. | | | | | 410 | |
| Cyclohexane, bbl./hr. | | | | | | 72.[8] |

[1] Straight run gasoline having 180–400° F. boiling range.
[2] Hexanes comprising iso-, normal-, cyclohexane, methylcyclopentane, and 2,2- and 2,4-dimethyl pentane.
[3] Hydrogen combined from zones 4 and 8, with 480,000 s.c.f./hour removed as untreated yield.
[4] Pentanes, 4:1 ratio normal to iso-.
[5] Butanes, 2:1 ratio normal to iso-.
[6] Benzene.
[7] Contains 60 barrels/hour of benzene.
[8] 99.7 mol percent pure product after $C_5$ and lighter removal.

Catalyst or reagent:
 A=Platinum on alumina reforming catalyst; 0.36 wt. percent platinum; 0.2 wt. percent chloride; and 0.5 wt. percent fluoride.
 B=Diethanolamine.
 C=Platinum on alumina base; 0.36 wt. percent platinum; 2.80 wt. percent fluoride; and 0.06 wt. percent chloride.
 D=Platinum on alumina base: 0.37 wt. percent platinum; less than 0.02 wt. percent fluoride; and 4.1 wt. percent chloride.
 E=Nickel on kieselguhr, conventional hydrogenation catalyst.

(b) isomerizing a first hydrocarbon using said hydrogen-rich stream therein, the heavier hydrocarbons in said hydrogen-rich stream being absorbed in the resulting isomerized hydrocarbon;
(c) isomerizing another hydrocarbon having a less carbon atom count than said first hydrocarbon using a hydrogen-rich stream recovered from step (b);
(d) hydrogenating a third hydrocarbon having a carbon atom count greater than said first hydrocarbon using a hydrogen-rich stream substantially free of hydrocarbons having the same carbon atom count as said third hydrocarbon recovered from step (c); and separating said hydrogenating step effluent to recover substantially pure hydrogenated third hydrocarbon.

3. The integrated hydrocarbon conversion process comprising:
(a) reforming a feed stock to produce a hydrogen stream containing hydrocarbons having 6-plus carbon atoms;
(b) isomerizing hydrocarbons having 5 carbon atoms using the hydrogen stream obtained in step (a), recovering the hydrogen stream reduced in 6-plus carbon atom hydrocarbons, and recovering isohydrocarbons having 5 carbon atoms;
(c) isomerizing hydrocarbons having 4 carbon atoms using the hydrogen stream recovered in step (b), recovering the hydrogen stream further reduced in 6-plus carbon atom hydrocarbons, and recovering isohydrocarbon having 4 carbon atoms;
(d) hydrogenating benzene using the hydrogen stream recovered in step (c); and separating the hydrogenated benzene effluent to recover substantially pure cyclohexane.

4. The integrated hydrocarbon conversion process comprising:
(a) passing a feedstock to a reforming zone; withdrawing a reformate from said reforming zone; processing said reformate to recover a benzene stream, an isohexane stream, and a normal hexane stream; and withdrawing a stream containing a high quantity of hydrogen and minor quantities of hydrocarbons up to and including p-plus carbon atoms;
(b) passing a pentane feed to a first isomerization zone; passing said hydrogen stream withdrawn from said reforming zone to said first isomerization zone, withdrawing isomerization effluent and separating same to recover an isopentane stream and withdrawing a stream containing a high quantity of hydrogen substantially free of 6-plus carbon atom hydrocarbons;
(c) passing a butane feed to a second isomerization zone, passing said hydrogen stream withdrawn from said first isomerization zone, withdrawing isomerization effluent from said second isomerization zone and separating same to recover an isobutane stream, and withdrawing a stream containing a high quantity of hydrogen substantially free of 5-plus carbon atom hydrocarbons;
(d) passing benzene recovered in step (a) to a hydrogenation zone, passing said hydrogen stream withdrawn from said second isomerization zone to said hydrogenation zone, and withdrawing hydrogenation effluent and separating same to recover substantially pure cyclohexane.

5. The process of claim 4 wherein additional benzene is fed to said hydrogenation zone.

6. The process of claim 4 further comprising amine treating the hydrogen stream withdrawn from said reforming zone prior to passing same to said first isomerization zone.

7. The process of claim 4 further comprising passing a feed stock to a separation zone and withdrawing the feed stock, pentane feed, and butane feed therefrom passing to steps (a), (b), and (c), respectively.

References Cited
UNITED STATES PATENTS

| | | | |
|---|---|---|---|
| 2,934,573 | 4/1960 | Paulsen et al. | 260—667 |
| 2,937,134 | 5/1960 | Bowles | 208—216 |
| 3,213,150 | 10/1965 | Cabbage | 260—667 |
| 3,213,151 | 10/1965 | Sherk | 260—667 |

DELBERT E. GANTZ, *Primary Examiner.*
SAMUEL P. JONES, *Examiner.*